United States Patent [19]

Kataoka

[11] Patent Number: 5,627,861
[45] Date of Patent: May 6, 1997

[54] CARRIER PHASE ESTIMATION SYSTEM USING FILTER

[75] Inventor: Nobuhisa Kataoka, Kamakura, Japan

[73] Assignee: Mitsubishi Denki Kabushiki Kaisha, Tokyo, Japan

[21] Appl. No.: 544,252

[22] Filed: Oct. 17, 1995

Related U.S. Application Data

[63] Continuation of Ser. No. 180,049, Jan. 11, 1994, abandoned.

[30] Foreign Application Priority Data

Jan. 19, 1993 [JP] Japan .................................. 5-006611
Dec. 2, 1993 [JP] Japan .................................. 5-302582

[51] Int. Cl.⁶ .................................................. H04L 27/14
[52] U.S. Cl. .......................... 375/324; 375/232; 375/284; 375/329; 375/346; 375/350; 329/308; 364/724.2
[58] Field of Search .............................. 375/229–235, 375/261, 266, 278, 284, 285, 324, 326, 329, 346, 349, 350; 364/724.16, 724.19, 724.2; 455/214, 296, 307; 329/304, 308, 318–320; 333/18, 28 R

[56] References Cited

U.S. PATENT DOCUMENTS

| | | | |
|---|---|---|---|
| 3,935,535 | 1/1976 | Motley et al. | 375/13 |
| 4,644,562 | 2/1987 | Kavehrad et al. | 375/15 |
| 4,975,927 | 12/1990 | Yoshida | 375/80 |
| 5,049,830 | 9/1991 | Yoshida | 329/306 |
| 5,185,764 | 2/1993 | Baier | 375/231 |
| 5,239,273 | 8/1993 | Hedstrom et al. | 329/312 |
| 5,245,611 | 9/1993 | Ling et al. | 370/100.1 |
| 5,307,157 | 4/1994 | Kobayashi et al. | 364/724.16 |
| 5,321,726 | 6/1994 | Kafadar | 375/79 |
| 5,434,889 | 7/1995 | Baier | 375/344 |

OTHER PUBLICATIONS

Shahid Qureshi, Adaptive Equalization, Mar. 1982, pp. 9–16, 1982 IEEE.

S. Yoshida & H. Tomita "A New Coherent Demodulation Technique for Land–Mobile Satellite Communications" pp. 622–627.

R. Harris & M. Yarwood "Carrier Recovery & Inter–Burst Interference in a Symbol–Synchronous TDMA System" International Journal of Satellite Communications, vol. 9, 1991 pp. 197–208.

A. Viterbi "Nonlinear Estimation of PSK–Modulated Carrier Phase with Application to Burst Digital Transmission" IEEE 1983 pp. 543–551.

*Primary Examiner*—Stephen Chin
*Assistant Examiner*—Amanda T. Le
*Attorney, Agent, or Firm*—Wolf, Greenfield & Sacks, P.C.

[57] ABSTRACT

A carrier phase estimation apparatus include a base band converter and a phase estimator. A received IF signal is converted to an in-phase component In and an quadrature component Qn of a digital base band signal in the base band converter. In the phase estimator, a non-linear circuit executes a non-linear operation of the components In and Qn to output non-linearly converted in-phase component In' and quadrature component Qn' of the digital base band signal and the components In' and Qn' are input to a pair of filters. In each filter, the components In' or Qn' are stored into shift registers at a predetermined timing and the signals stored in the shift registers are multiplied by respective weighting factors $C_k$ in respective multipliers. The multiplied values are summed by an adder and the obtained sum is divided by a stage number N of the shift register in a divider to obtain filtering signals Xn and Yn. That is, the weighted averaging of the components In' and Qn' is taken in the filters and then the filtering signals are transformed in a coordinate transformer to calculate an estimated carrier phase $\Theta n$. By taking the weighted average, the carrier phase fluctuating due to fading can be more precisely estimated. In an alternate embodiment, a polynomial approximation is conducted using the components stored in the shift registers to generate filtering signals.

13 Claims, 16 Drawing Sheets

| | n | | | | | $X_3$ | $Y_3$ | $H_3$ | ESTIMATION ERROR |
|---|---|---|---|---|---|---|---|---|---|
| | 1 | 2 | 3 | 4 | 5 | | | | |
| In' | 0.707 | 0.342 | -0.174 | 0.342 | 0.707 | | | | |
| Qn' | 0.707 | 0.940 | 0.985 | 0.940 | 0.707 | 0.199 | 0.599 | 35.8° | 14.2° |
| Ck | $0.7^2$ | 0.7 | 1 | 0.7 | $0.7^2$ | | | | |
| CkIn' | 0.346 | 0.239 | -0.174 | 0.239 | 0.346 | | | | |
| CkQn' | 0.346 | 0.658 | 0.985 | 0.658 | 0.346 | | | | |

Fig. 3

| | n | | | | | $X_3$ | $Y_3$ | $H_3$ |
|---|---|---|---|---|---|---|---|---|
| | 1 | 2 | 3 | 4 | 5 | | | |
| In' | 0.707 | 0.707 | 0.707 | 0.707 | 0.707 | | 0.707 | 22.5° |
| Qn' | 0.707 | 0.707 | 0.707 | 0.707 | 0.707 | 0.707 | 0.707 | |

Fig. 10 PRIOR ART

| | n | | | | | $X_3$ | $Y_3$ | $\textcircled{H}_3$ | ESTIMATION ERROR |
|---|---|---|---|---|---|---|---|---|---|
| | 1 | 2 | 3 | 4 | 5 | | | | |
| In' | 0.707 | 0.342 | -0.174 | 0.342 | 0.707 | 0.385 | 0.856 | 32.9° | 17.1° |
| Qn' | 0.707 | 0.940 | 0.985 | 0.940 | 0.707 | | | | |

Fig. 14 PRIOR ART

CARRIER PHASE ESTIMATION SYSTEM USING FILTER

This application is a continuation of application Ser. No. 08/180,049, filed Jan. 11, 1994 abandoned.

BACKGROUND OF THE INVENTION i) Field of the Invention

The present invention relates to a carrier phase estimation apparatus for estimating a carrier phase of a PSK-modulated received signal in a radio communication field by a movable body such as a mobile satellite communication, and more particularly to a carrier phase estimation apparatus constituted by digital circuits, which is capable of following up a received carrier phase variation caused by fading.

ii) Description of the Related Arts

FIG. 7 illustrates a conventional digital carrier phase estimation apparatus for estimating a carrier phase of a PSK-(phase shift keying-) modulated received signal, as disclosed in "Nonlinear Estimation of PSK-Modulated Carrier Phase with Application to Burst Digital Transmission" by Andrew J. Viterbi and Audrey M. Miterbi, IEEE Transactions of Information Theory, Vol. IT-29, No. 4, pp. 543–551, July, 1983. As shown in FIG. 7, a base band converter 1 takes a received IF signal 3 as input and outputs an in-phase component In and an quadrature component Qn of a digital base band signal. A phase estimator 2 receives the in-phase component In and the quadrature component Qn output from the base band converter 1 and estimates a received carrier phase θ every symbol and outputs a carrier phase θ estimated every symbol (herein-after referred to as an estimated carrier phase Θn; n=0, 1, 3, ... ). The base band converter 1 includes a pair of multipliers 4 and 5 for receiving the received IF signal 3 and the output signals of the multipliers 4 and 5 are supplied to a pair of LPFs (low pass filters) 8 and 9, respectively. The output signals of the LPFs 8 and 9 are fed to a pair of A/D (analog-digital) converters 10 and 11, respectively, and the A/D converters 10 and 11 convert the output signals into digital signals to obtain the in-phase component In and the quadrature component Qn of the digital base band signal. The base band converter 1 further includes a carrier oscillator 8 and a 90° phase shifter 7. Because of the carrier oscillator 6 and the 90° phase shifter 7, carrier signals having 90° different phases are supplied to the multipliers 4 and 5.

The phase estimator 2 includes a non-linear circuit 12 which receives the in-phase component In and the quadrature component Qn of the digital base band signal and executes a non-linear operation. The in-phase and quadrature components In' and Qn' output by the non-linear circuit 12 are input to a pair of filters 13 and 14 and the output signals of the filters 13 and 14 are sent to a coordinate transformer 18 which transforms the output signals into a carrier phase Θn. The filters 13 and 14 have the same construction and each filter 13 or 14 is constituted by N (N is a positive integer) stages of shift registers 15, an adder 16 and a divider 17.

Next, an operation of the conventional carrier phase estimation apparatus shown in FIG. 7 will be described in detail.

First the received IF signal 3 is converted into the in-phase component In and the quadrature component Qn of the digital base band signal by the base band converter 1. In the base band converter 1, the received IF signal 3 is branched off in two directions, that is, one branch is input to the multiplier 4 and the other branch is input to the multiplier 5.

The carrier oscillator 6 outputs a carrier having the same frequency as that of the received IF signal 3 and the output signal of the carrier oscillator 6 is supplied to the multiplier 4. As a result, in the multiplier 4, a product of the received IF signal 3 and the output signal of the carrier oscillator 6 is obtained. On the other hand, the output signal of the carrier oscillator 6 is input to the multiplier 5 via the 90° phase shifter 7. As a result, in the multiplier 5, a product of the received IF signal 3 and the output signal of the 90° phase shifter 7 is obtained.

The output signal of the multiplier 4 is input to the LPF 8 and the LPF 8 removes unnecessary harmonic components from the output signal of the multiplier 4 and outputs the in-phase component of the base band signal. The output signal of the multiplier 5 is input to the LPF 9 and the LPF 9 removes unnecessary harmonic components from the output signal of the multiplier 5 and outputs the quadrature component of the base band signal. The in-phase component of the base band signal output from the LPF 8 is input to the A/D converter 10 in which the in-phase component is sampled by a clock (not shown) of a symbol period and is converted into the in-phase component In of the digital base band signal, and the A/D converter 10 outputs the in-phase component In of the digital base band signal. The quadrature component of the base band signal output from the LPF 9 is input to the A/D converter 11 in which the quadrature component is sampled by a clock (not shown) of a symbol period and is converted into the quadrature component Qn of the digital base band signal, and the A/D converter 11 outputs the quadrature component Qn of the digital base band signal.

In this case, for simplifying and better understanding of the explanation, it is assumed that the received IF signal 8 is a BPSK-(binary PSK-) modulated signal with no noise and a phase difference between the received IF signal 3 and the output signal of the carrier oscillator 6 is, for example, 22.5°. For example, when a data series is "10110", the in-phase component In and the quadrature component Qn of the digital base band signal are represented by formulas (1) represented hereinbelow. And these components are shown by (a) to (e) in FIG. 8.

$$In = A \cdot d_n \cdot \cos\theta n$$

$$Qn = A \cdot d_n \cdot \sin\theta n \qquad (1)$$

In the formulas (1), A represents an amplitude and dn represents a value of either +1 or −1 corresponding to "1" and "0". In this case, the value of 22.5° is a value of the carrier phase to be estimated by the carrier phase estimation apparatus.

Next, the in-phase component In and the quadrature component Qn of the digital base band signal are input to the phase estimator 2. In the phase estimator 2, first, the components In and Qn are input to the non-linear circuit 12 which executes a non-linear operation represented by formula (2) shown below against the in-phase component In and the quadrature component Qn.

$$In' = \rho \cdot \cos m\theta n$$

$$Qn' = \rho \cdot \sin m\theta n \qquad (2)$$

In the formulas (2), m represents a value corresponding to an m-phase PSK signal. For instance, in the case of the BPSK signal, because of binary phase, m=2 and in the case of a QPSK signal, m=4. Also, ρ possesses a function for changing the estimation characteristics of the carrier phase by its value. In the aforementioned document, it is disclosed that good results can be obtained when ρ=1 or ρ=In²+Qn². In this case, for simplifying the explanation, assuming that ρ=1, when the received IF signal 3 is the BPSK-modulated signal, the output signals In' and Qn' of the non-linear circuit 12 are shown by formulas (3) as follows.

$$In'=\cos 2\theta n$$

$$Qn'=\sin 2\theta n \tag{3}$$

FIG. 9 illustrates the signals In' and Qn' which are obtained by modifying the in-phase component In and the quadrature component Qn of the digital base band signal shown in FIG. 8 by the non-linear circuit 12. In this case, $2\theta_1=2\theta_2=2\theta_3=2\theta_4=2\theta_5=45°$ and the data modulating component is removed. That is, the non-linear circuit 12 removes the data modulating component of the m-phase PSK signal.

FIG. 10 shows the above-described converted values In' and Qn' as a list. As shown in FIG. 10, in this case, the in-phase components of the digital base band signal become In'=cos2θn=cos45°=0.707 and the quadrature components of the same become Qn'=sin2θn=sin45°=0.707.

The in-phase components In' and the quadrature components Qn' of the digital base band signals, modified and output by the non-linear circuit 12, are supplied to the respective filters 13 and 14 in which the noise included in the components In' and Qn' is reduced.

In the filter 13, the in-phase components In' of the digital base band signal is input to the shift registers 15. The N number of components In' input in the shift registers 15 are added to each other in the adder 16. At this time, the value of the symbol number n of the filter output signal Xn is equal to the symbol number n of the component In' input in the central stage of the shift registers 15. For example, as shown in FIG. 10, in the state that 5 components In' of n=1 to 5 are input in the shift registers 15, the component $I_3'$ is input in the central stage of the shift registers 15 and thus the filter output signal Xn is $X_3$. That is, the filter 18 performs the operation for taking an average by using the (N−1)/2 numbers off the components In' aligned in the front and rear sides of the central component In' input in the central stage of the shift registers 15 to reduce the noise.

The filter 14 has the same construction as the filter 13 and operates the input quadrature components Qn' of the digital base band signals in the same manner as the filter 13 to output a filter output signal Yn.

In the example shown in FIG. 10, $$X_3 = (0.707 + 0.707 + 0.707 + 0.707 + 0.707)/5$$
$$= 0.707, \text{ and}$$
$$Y_3 = (0.707 + 0.707 + 0.707 + 0.707 + 0.707)/5$$
$$= 0.707.$$

Next, the filter output signals Xn and Yn are input to the coordinate transformer 18. The coordinate transformer 18 executes an operation shown in formula (4) and outputs the estimated carrier phase Θn.

$$\Theta n=(1/m)\cdot\tan^{-1}(Yn/Xn) \tag{4}$$

In formula (4), m represents the value corresponding to the m-phase PSK signal, and in the case of the BPSK signal, m=2. Also, in the case of the QPSK signal, m=4. In the example shown in FIG. 10, it is calculated as follows.

$$\Theta n=(½)\cdot\tan^{-1}(Y_3/X_3)=22.5° \tag{5}$$

In this case, the true estimation value of the carrier phase Θ=22.5° is estimated. The estimation operation of the above-described carrier phase is carried out against each symbol (n=..., −2, −1, 0, 1, 2, 3, ...).

In the conventional embodiment described above, since the case that no noise is attached to the received IF signal 3 is described, the carrier phase can be estimated without any error. However, in case that noise Is contained in the received IF signals 3, in order to remove the influence of the noise, a required larger number of filter stages are designed.

In FIG. 11, there is shown a conventional data demodulation apparatus using the carrier phase estimated in the above-described carrier phase estimation apparatus.

As shown in FIG. 11, a sine wave generator 19 inputs the estimated carrier phase Θn output from the phase estimator 2 and outputs cosine and sine signals of cosΘn and sinΘn. A pair of multipliers 20 and 21 multiply the output signals cosΘn and sinΘn of the sine wave generator 19 by the in-phase component In and the quadrature component Qn of the digital base band signal, respectively, to output signals $t_n$ and $u_n$, respectively. The output signals $t_n$ and $u_n$ of the multipliers 20 and 21 are added to each other in an adder 22. The added value of the adder 22 is supplied to a discriminator 23 and the discriminator 23 discriminates the input data and outputs demodulated data.

The in-phase component In and the quadrature component Qn of the digital base band signal are represented by formulas (1) and hence the signals $t_n$ and $u_n$ output from the multipliers 20 and 21 are represented in formulas (6) as follows.

$$t_n=A\cdot d_n\cdot\cos\theta n\cdot\cos\Theta n$$

$$u_n=A\cdot d_n\cdot\sin\theta n\cdot\sin\Theta n \tag{6}$$

When the carrier phase estimation apparatus correctly estimates the carrier phase, Θn=θn and the formulas (6) can be rewritten to formulas (7) as follows.

$$t_n=A\cdot d_n\cdot\cos^2\theta n$$

$$u_n=A\cdot d_n\cdot\sin^2\theta n \tag{7}$$

As a result, the output signal of the adder 22 is $t_n+u_n=A\cdot d_n$. Hence, the discriminator 23 discriminates the positive and the negative of the output signal $A\cdot d_n$ of the adder 22 to demodulate the data.

As described above, the conventional carrier phase estimation apparatus can be realized by using the digital signal processing technique and thus is suitable for miniaturization and non-adjustment. However, when the carrier phase estimation apparatus is required to be mounted on a mobile or movable body, for example, in a mobile communication system or a mobile satellite communication system by which a movable body performs communication by using satellites, the received carrier phase is affected by fading and thus is usually fluctuated.

Accordingly, when the conventional carrier phase estimation apparatus is applied to such communication systems as it is, the carrier estimation characteristics are degraded by the fading and bit error rate characteristics of the demodulated data become deteriorated. This problem will be described in connected with embodiments.

FIG. 12 illustrates the in-phase components In and the quadrature components Qn of the digital base band signal in a similar manner to the example of the BPSK signal shown in FIG. 8. However, in the instance shown in FIG. 12, even when no noise is attached to the received IF signal 3, the in-phase component In and the quadrature component Qn of the digital base band signal are fluctuated by the influence of the fading.

In this shown example, the carrier phase of the first symbol (n=1) is 22.5°, the carrier phase of the second symbol (n=2) increases 12.5° compared to the carrier phase of the first symbol, the carrier phase of the third symbol (n=3) increases 15° compared to the carrier phase of the second symbol, the carrier phase of the fourth symbol (n=4) decreases 15° compared to the carrier phase of the third symbol, and the carrier phase of the fifth symbol (n=5) decreases 12.5° compared to the carrier phase of the fourth symbol. That is, the carrier phases fluctuate as follows.

$\theta_1 = 22.5°$ $\theta_2 = 215°$ $\theta_3 = 50°$ $\theta_4 = 35°$ $\theta_5 = 202.5°$ FIG. 13 shows the output signals In' and Qn' of the non-linear circuit 12 corresponding to the in-phase component In and the quadrature component Qn of the digital base band signal shown in FIG. 12. That is, the following values are obtained.

$2\theta_1 = 45°$ $2\theta_2 = 70°$ $2\theta_3 = 100°$ $2\theta_4 = 70°$ $2\theta_5 = 45°$ FIG. 14 illustrates the output signals In' and Qn' shown in FIG. 13 by numerical values. That is, relating to the in-phase components In', the following values are obtained.

$I_1' = \cos 2\theta_1 = \cos 45° = 0.707$ $I_2' = \cos 2\theta_2 = \cos 70° = 0.342$ $I_3' = \cos 2\theta_3 = \cos 100° = -0.174$ $I_4' = \cos 2\theta_4 = \cos 70° = 0.342$ $I_5' = \cos 2\theta_5 = \cos 45° = 0.707$ Also, regarding the quadrature component Qn', the following values are obtained.

$Q_1' = \sin 2\theta_1 = \sin 45° = 0.707$ $Q_2' = \sin 2\theta_2 = \sin 70° = 0.940$ $Q_3' = \sin 2\theta_3 = \sin 100° = 0.985$ $Q_4' = \sin 2\theta_4 = \sin 70° = 0.940$ $Q_5' = \sin 2\theta_5 = \sin 45° = 0.707$ Hence, the filter output signals Xn and Yn of the filters 13 and 14 are obtained as follows.

$$\begin{aligned} X_3 &= (0.707 + 0.342 - 0.174 + 0.342 + 0.707)/5 \\ &= 0.385 \\ Y_3 &= (0.707 + 0.940 + 0.985 + 0.940 + 0.707)/5 \\ &= 0.856 \end{aligned}$$

Thus, the estimated carrier phase $\Theta_3$ is calculated as follows.

$\Theta_3 = (½) \cdot \tan^{-1}(0.856/0.385) = 32.9°$

Since the true value of the carrier phase to be estimated is $\theta_3 = 50°$, the carrier phase $\Theta_3 = 32.9°$ actually estimated by the above-described conventional carrier phase estimation apparatus has an estimation error of 17.1° from the true value. This estimation error is caused due to the fact that, though the carrier phases fluctuate due to the influence of fading, the average value is simply taken without considering any fluctuation of the carrier phases in the conventional carrier phase estimation apparatus. That is, in the conventional carrier phase estimation apparatus, only the noise is considered and a simple average value is taken for removing the influence of the noise. Hence, when the conventional carrier phase estimation apparatus is used for mobile communication systems in which fading is generated, the previously remarkable bit error rate characteristics are degraded and it is difficult to apply the conventional carrier phase estimation apparatus to such communication systems as it is.

As described above, the conventional carrier phase estimation apparatus does not include any good follow-up characteristics against the carrier phase fluctuation caused by fading and thus the bit error rate characteristics in a fading channel are deteriorated.

SUMMARY OF THE INVENTION

It is therefore an object of the present invention to provide a carrier phase estimation apparatus in view of the aforementioned problems of the prior art, which is capable of suitably following up a carrier phase fluctuating due to fading and realizing low bit error rate characteristics.

In accordance with one aspect of the present invention, there is provided a carrier phase estimation apparatus, comprising: a) base band converter means for converting a received signal into a base band signal; b) non-linear converter means for carrying out a non-linear conversion of the base band signal to output a non-linear conversion signal; c) arithmetic means for setting weighting factors for a plurality of the non-linear conversion signals sampled at a predetermined time interval and calculating the weighting factors to the respective non-linear conversion signals to obtain a filtering signal; and d) coordinate transform means for transforming the filtering signal to output an estimation carrier phase, the weighting factors including a first weighting factor, the non-linear conversion signals including a first non-linear conversion signal, the first weighting factor corresponding to the first non-linear conversion signal at an estimation subject timing for estimating a carrier phase being larger than other weighting factors except the first weighting factor corresponding to other non-linear conversion signals except the first non-linear conversion signal at other timings.

In accordance with another aspect of the present invention, there is provided a carrier phase estimation apparatus, comprising: a) digital base band converter means for converting received signals into digital base band signals sampled at a predetermined time interval; b) non-linear converter means for carrying out a non-linear conversion of the digital base band signals to output digital non-linear conversion signals; c) shift register means for storing the digital non-linear conversion signals; d) multiplier means for setting weighting factors for a plurality of the digital non-linear conversion signals stored in the shift register means and multiplying the weighting factors to the respective digital non-linear conversion signals to obtain multiplication signals; e) adder means for calculating the multiplication signals to output a filtering signal; and f) coordinate transform means for transforming the filtering signal to output an estimation carrier phase, the weighting factors including a first weighting factor, the digital non-linear conversion signals including a first digital non-linear conversion signal, the first weighting factor corresponding to the first digital non-linear conversion signal at an estimation subject timing for estimating a carrier phase being larger than other weighting factors except the first weighting factor corresponding to other digital non-linear conversion signals except the first digital non-linear conversion signal, the other weighting factors being successively diminished with time separation from the estimation subject timing.

In accordance with a further aspect of the present invention, there is provided a carrier phase estimation apparatus for estimating a carrier phase of a phase shift keying modulated received signal, comprising: a) base band converter means for converting the received signal into a base band signal; and b) phase estimating means for filtering the base band signal to estimate the carrier phase and to output an estimated carrier phase, the phase estimating means including: 1) non-linear converter means for carrying out a non-linear conversion of the base band signal to output a non-linear conversion signal; 2) filter means composed of arithmetic means for setting weighting factors for a plurality of the non-linear conversion signals sampled at a predetermined time interval and calculating the weighting factors to the respective non-linear conversion signals to obtain a filtering signal; and 3) coordinate transform means for transforming the filtering signal to output the estimation carrier phase, the weighting factors including a first weighting factor, the non-linear conversion signals Including a first non-linear conversion signal, the first weighting factor corresponding to the first non-linear conversion signal at an estimation subject timing for estimating a carrier phase being larger than other weighting factors except the first weighting factor corresponding to other non-linear conversion signals except the first non-linear conversion signal at other timings.

In accordance with another aspect of the present invention, there is provided a carrier phase estimation apparatus for estimating a carrier phase of a phase shift keying modulated received signal, comprising: a) digital base band converter means for converting the received signals into digital base band signals sampled at a predetermined time interval; and b) phase estimating means for filtering the digital base band signals to estimate the carrier phase and to output an estimated carrier phase, the phase estimating means including: 1) non-linear converter means for carrying out a non-linear conversion of the digital base band signals to output digital non-linear conversion signals; 2) shift register means for storing a plurality of the digital non-linear conversion signals; 3) multiplier means for setting weighting factors for the digital non-linear conversion signals stored in the shift register means and multiplying the weighting factors to the respective digital non-linear conversion signals to obtain multiplication signals; 4) adder means for calculating the multiplication signals to output a filtering signal; and 5) coordinate transform means for transforming the filtering signal to output an estimation carrier phase, the weighting factors including a first weighting factor, the non-linear conversion signals including a first non-linear conversion signal, the first weighting factor corresponding to the first non-linear conversion signal at an estimation subject timing for estimating a carrier phase being larger than other weighting factors except the first weighting factor corresponding to other non-linear conversion signals except the first non-linear conversion signal, the other weighting factors being successively diminished with time separation from the estimation subject timing.

In accordance with still another aspect of the present invention, there is provided a carrier phase estimation apparatus, comprising: a) base band converter means for converting a received signal into a base band signal; b) non-linear converter means for carrying out a non-linear conversion of the base band signal to output a non-linear conversion signal; c) approximating means for carrying out an approximation of a plurality of the non-linear conversion signals sampled at a predetermined time interval corresponding to time; and d) filtering signal formation means for producing a filtering signal of the non-linear conversion signals at an estimation subject timing of a carrier phase on the basis of an approximation result of the approximating means.

In accordance with another aspect of the present invention, there is provided a carrier phase estimation apparatus, comprising: a) digital base band converter means for converting received signals into digital base band signals sampled at a predetermined time interval; b) non-linear converter means for carrying out a non-linear conversion of the digital base band signals to output digital non-linear conversion signals; c) shift register means for storing a plurality of the digital non-linear conversion signals; d) approximate polynomial formation means for carrying out an approximation of a plurality of the digital non-linear conversion signals stored in the shift register means by a polynomial expression of time to obtain an approximate polynomial expression; and e) filtering signal formation means for calculating a value of the approximate polynomial expression at an estimation subject timing for estimating a carrier phase by using the approximate polynomial expression obtained in the approximate polynomial formation means to output a filtering signal of the digital non-linear conversion signals.

In accordance with another aspect of the present invention, there is provided a carrier phase estimation apparatus for estimating a carrier phase of a phase shift keying modulated received signal, comprising: a) base band converter means for converting the received signals into base band signals; and b) phase estimating means for filtering the base band signals to estimate the carrier phase and to output an estimated carrier phase, the phase estimating means including: 1) non-linear converter means for carrying out a non-linear conversion of the base band signals to output non-linear conversion signals; 2) approximating means for carrying out an approximation of a plurality of the non-linear conversion signals sampled at a predetermined time interval corresponding to time; 3) filter means composed of filtering signal formation means for producing a filtering signal of the non-linear conversion signals at an estimation subject timing of the carrier phase on the basis of an approximation result of the approximating means; and 4) coordinate transform means for transforming the filtering signal to output the estimation carrier phase.

In accordance with still another aspect of the present invention, there is provided a carrier phase estimation apparatus for estimating a carrier phase of a phase shift keying modulated received signal, comprising: a) digital base band converter means for converting the received signals into digital base band signals sampled at a predetermined time interval; and b) phase estimating means for filtering the digital base band signals to estimate the carrier phase and to output an estimated carrier phase, the phase estimating means including: 1) non-linear converter means for carrying out a non-linear conversion of the digital base band signals to output digital non-linear conversion signals; 2) shift register means for storing a plurality of the digital non-linear conversion signals; 3) approximate polynomial formation means for carrying out an approximation of a plurality of the digital non-linear conversion signals stored in the shift register means by a polynomial expression of time to obtain an approximate polynomial expression; 4) filter means composed of filtering signal formation means for calculating a value of the approximate polynomial expression at an estimation subject timing for estimating a carrier phase by using the approximate polynomial expression obtained in the approximate polynomial formation means to output a filtering signal of the digital non-linear conversion signals; and 5) coordinate transform means for transforming the filtering signal to output the estimation carrier phase.

In the carrier phase estimation apparatus, the weighting factors can be adaptably set depending on a channel state.

The first non-linear conversion signal corresponding to the first weighting factor is positioned in a central part of the shift register means.

According to the present invention, in the carrier phase estimation apparatus, the filtering signal obtained from the received signals is transformed to output the estimated carrier phase of the received signals.

Also, in the carrier phase estimation apparatus of the present invention, by sampling the received signals, a weighting factor average value of each sampling value is calculated to obtain the filtering signal. This filtering signal is transformed to output the estimated carrier phase. Hence, a precise estimated carrier phase can be obtained.

Further, in the carrier phase estimation apparatus according to the present invention, the estimated carrier phase of the phase shift keying modulated received signals is calculated.

Moreover, in the carrier phase estimation apparatus of the present invention, by sampling the received signals, each sampling value is approximated with respect to time to obtain the estimated carrier phase based on this approximation value.

Also, in the carrier phase estimation apparatus of the present invention, the received signals are approximated by using the polynomial expression of time to obtain the estimated carrier phase based on this approximation value.

Further, in the carrier phase estimation apparatus according to the present invention, by sampling the phase shift keying modulated received signals, each sampling value is approximated by the polynomial expression of time to obtain the estimated carrier phase of the received signals on the basis of this approximation value.

Furthermore, in the carrier phase estimation apparatus of the present invention, the phase shift keying modulated received signals are approximated by the polynomial expression of time and the estimated carrier phase of the received signals is output on the basis of this approximation value.

Also, in the carrier phase estimation apparatus, the weighting factors are adaptably varied to obtain more precise estimation carrier phase.

BRIEF DESCRIPTION OF THE DRAWINGS

The objects, features and advantages of the present invention will become more apparent from the consideration of the following detailed description, taken in conjunction with the accompanying drawings, in which:

FIG. 3 is a diagram showing an amplitude of a non-linearly converted digital base band signal fluctuating due to fading, weighting factors and the like in the apparatus according to the present invention;

FIG. 10 is a diagram showing an amplitude of the non-linearly converted digital base band signals, filter output signals and an estimated phase obtained in the conventional apparatus;

FIG. 14 is a diagram showing an amplitude of the non-linearly converted digital base band signals, filter output signals and the like in the conventional apparatus when carrier phase is fluctuated by the fading;

DESCRIPTION OF THE PREFERRED EMBODIMENTS

Figure 1:
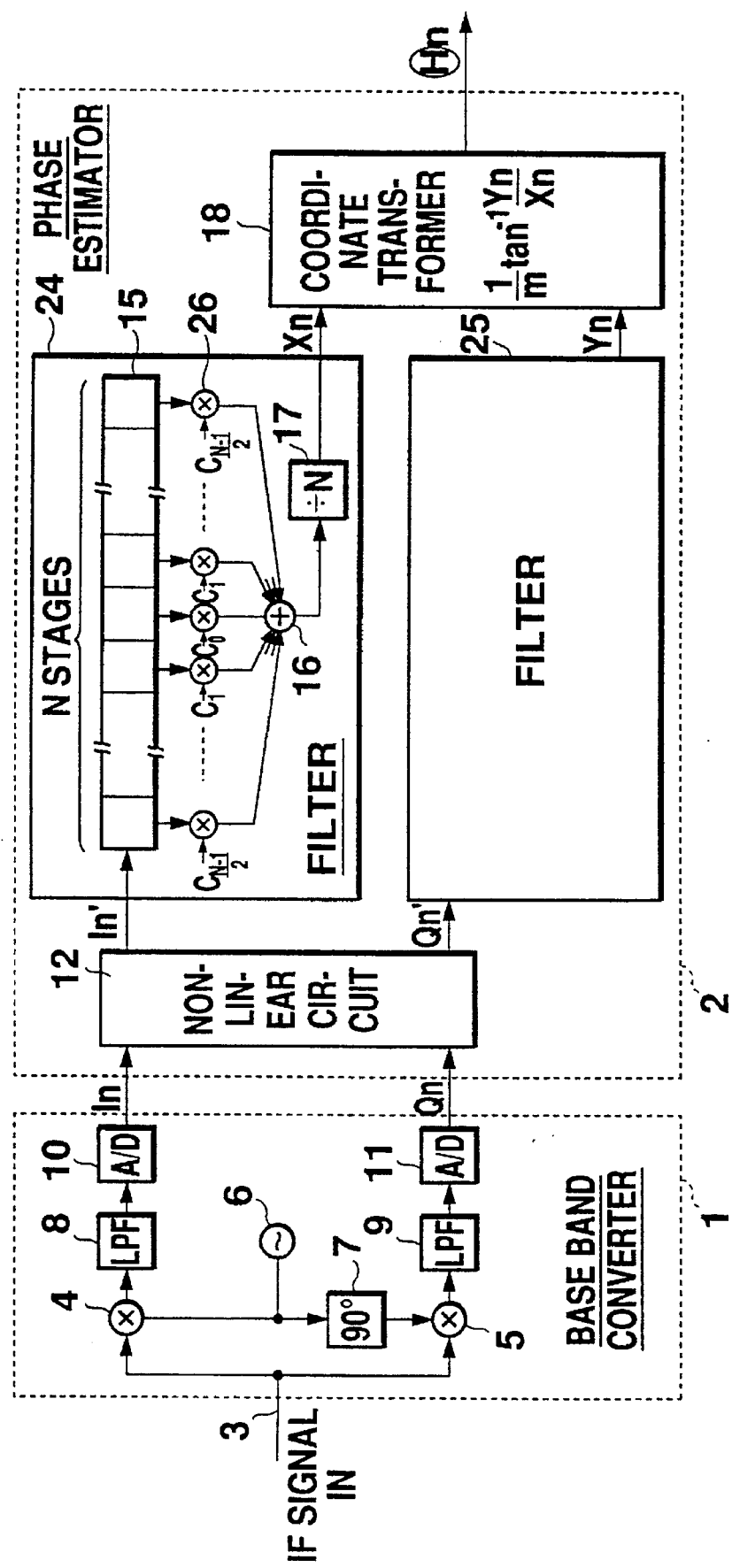
FIG. 1 is a block diagram of a first embodiment of a carrier phase estimation apparatus according to the present invention.

The present invention will now be described in connection with its preferred embodiments with reference to the accompanying drawings, wherein like reference characters designate like or corresponding parts throughout the views and thus the repeated description thereof can be omitted for brevity.

In FIG. 1, there is shown the first embodiment of a carrier phase estimation apparatus according to the present invention. As shown in FIG. 1, the carrier phase estimation apparatus comprises a base band converter 1 and a phase estimator 2. The base band converter 1 has the same construction and function as that of the conventional carrier phase estimation apparatus described above and thus a detailed description thereof can be omitted for brevity. The phase estimator 2 includes a non-linear circuit 12, a pair of filters 24 and 25 and a coordinate transformer 18. In the phase estimator 2, the non-linear circuit 12 and the coordinate transformer 18 have the same constructions and functions as those of the conventional carrier phase estimation apparatus. The filters 24 and 25 input the in-phase component In' and the quadrature component Qn' of the digital base band signal, respectively, and execute a filtering. The filter 24 has the same construction as the filter 25. The filter 24 includes N stages of shift registers 15, N number of multipliers 26 connected to the respective shift registers 15 for multiplying the signal stored in each register 15 by a weighting factor $C_k$, an adder 16 and a divider 17.

The operation of the carrier phase estimation apparatus shown in FIG. 1 will now be described in connection with FIG. 12 and FIG. 13 which were referred to during the explanation of the conventional carrier phase estimation apparatus.

In FIG. 1, the base band converter 1 inputs a received IF signal 3 and outputs an in-phase component In and an quadrature component Qn of a digital base band signal. As shown in FIG. 12, the components In and Qn (n=1 to 5) of the digital base band signal, fluctuating due to fading, are input to the non-linear circuit 12 in the phase estimator 2. The non-linear circuit 12 performs a non-linear conversion of the components In and Qn and outputs an in-phase component In' and an quadrature component Qn' of the digital base band signal, as shown in FIG. 13. The in-phase component In' of the digital base band signal is output from the non-linear circuit 12 to the filter 24.

In the filter 24, the in-phase component In' is input to the shift registers 15 and the multipliers 26 multiply the in-phase component In' input into the respective shift registers 15 by suitable respective weighting factors $C_k$ at an input timing of the shift registers 15. The output signals of the multipliers 26 are summed by the adder 16 and the summed value is divided by the filter stage number N in the divider 17 to output a filter output signal Xn.

In this embodiment, as the feature of the present invention, as described above, a simple average of the in-phase component In' stored in the shift registers 15 is not taken but results of the in-phase component In' multiplied by the weighting factors $C_k$, in the multipliers 26, are averaged.

The filter 25 has the same construction as the filter 24 and operates on the input quadrature components Qn' of the digital base band signals in the same manner as the filter 24 to output a filter output signal Yn.

In the following description, the appendant k of the weighting factors $C_k$ is determined to 0 in the central stage of the filter and with separation from the central stage to the front and rear direction, its absolute value is determined to be increased, that is, k=0, 1, 2, 3, ... , and an actual value of the weighting factor $C_k$ is determined to 1 in the central stage ($C_o$=1) and, differing from the central stage of the filter, its actual value is determined to be decreased. Now, for example, it is considered that the weighting factor $C_k$ is represented by formula (9) as follows.

$$C_k = 0.7^k \tag{9}$$

That is, the signal stored in the central stage of the shift registers 15 is multiplied by $C_o$=0.7⁰=1, the signals stored in the two stages adjacent to the central stage in both the front and rear directions are multiplied by $C_1$=0.7¹=0.7 and further the signals stored in the two stages which are two stages removed before and after the central stage are multiplied by $C_2$=0.7²=0.49.

Figure 13:
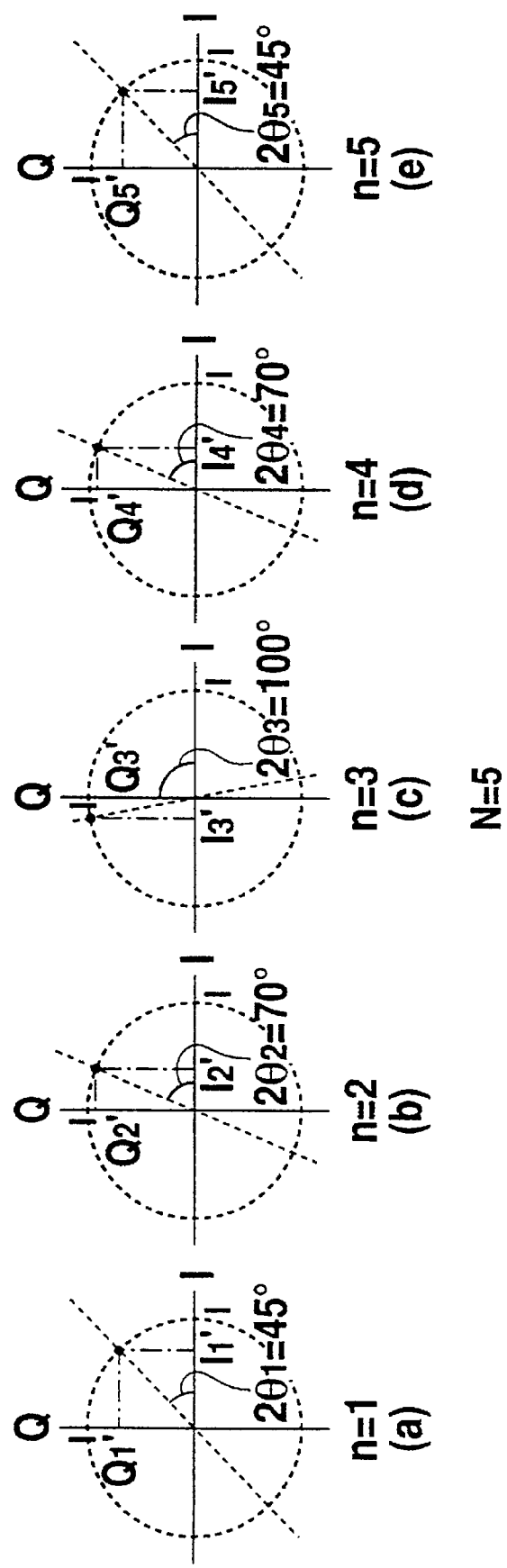
FIG. 13 is a graphical representation showing non-linearly converted digital base band signals fluctuating due to the fading.

FIG. 3 shows, in connection with the example shown In FIG. 13, the values of the components In' and Qn' of the digital base band signal before the weighting factors are not multiplied, the weighting factor $C_k$ and the weighted components $C_k$In' and $C_k$Qn' of the digital base band signal after the weighting factors are multiplied. As shown in FIG. 3, the filter output signals $X_3$ and $Y_3$ are calculated as follows.

$$X_3 = (0.346 + 0.239 - 0.174 + 0.239 + 0.346)/5$$
$$= 0.199$$
$$Y_3 = (0.346 + 0.658 + 0.985 + 0.658 + 0.346)/5$$
$$= 0.599$$

The coordinate transformer 18 receives input the filter output signals $X_3$ and $Y_3$ and operates according to formula (4) to output the estimated carrier phase $\Theta_3$, as shown in FIG. 3.

$$\Theta_3 = (\tfrac{1}{2}) \cdot \tan^{-1}(0.599/0.199) = 35.8° \tag{10}$$

Essentially, the value of the true carrier phase to be estimated is $\Theta_3$=50° and the estimation error of the estimated carrier phase obtained in this embodiment is 14.2°. This estimation error is smaller than the 17.1° which resulted in the conventional carrier phase estimation apparatus described above. As described above, in this embodiment, the weighted averaging is used for the components In' and Qn' of the digital base band signal and the estimation carrier phase is obtained from the weighted average value. Hence, according to the present invention, the carrier phase estimation apparatus can well track or follow up the fluctuation of the carrier phase in comparison with the conventional carrier phase estimation apparatus. That is, the carrier phase estimation apparatus according to the present Invention can properly follow up the carrier phase fluctuating due to the fading.

Figure 4:
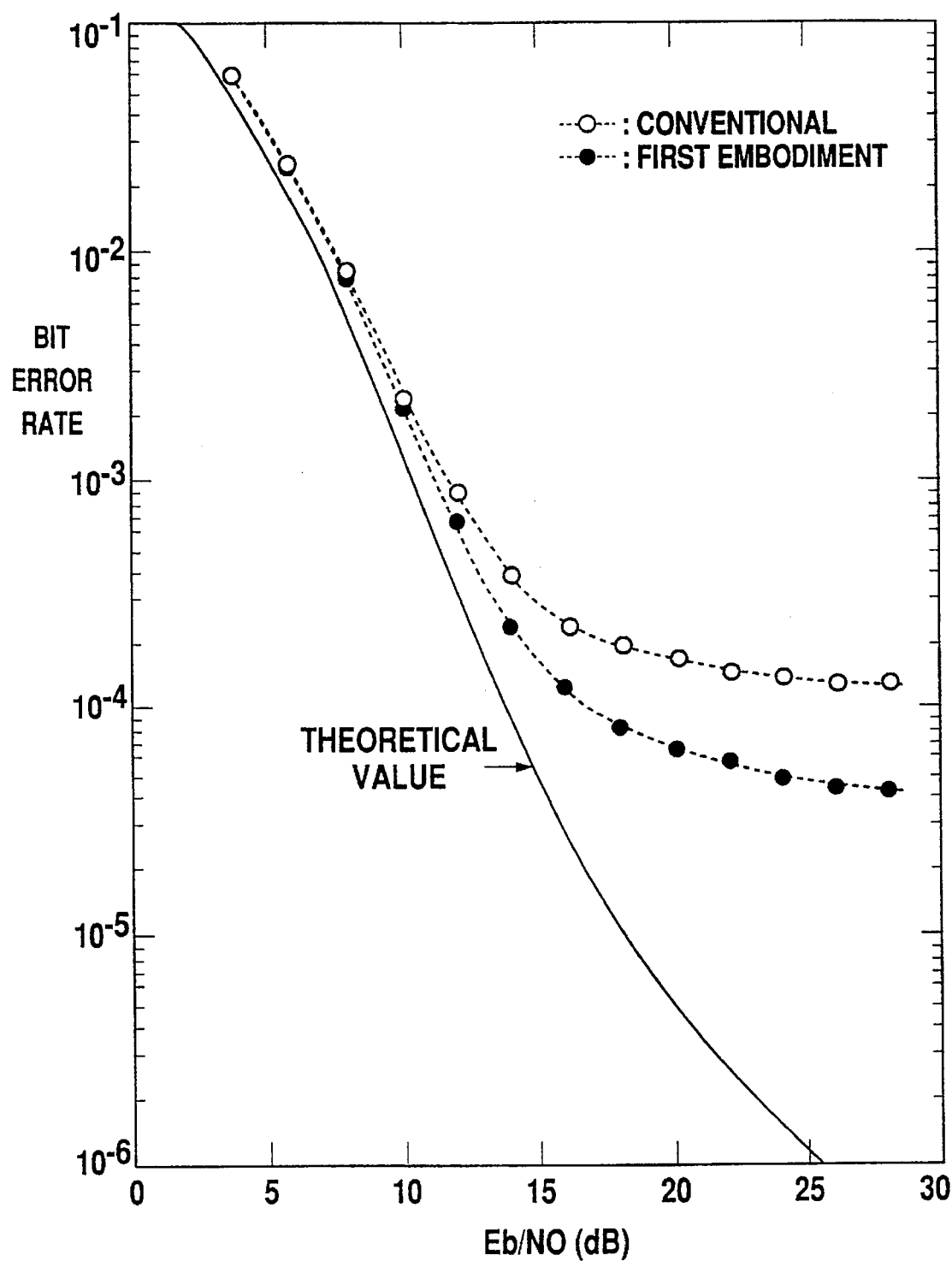
FIG. 4 is a graphical representation showing bit error rate characteristics obtained in the first embodiment of the present invention.

FIG. 4 illustrates a simulation result of the bit error rate characteristics realized under conditions shown in Table 1 by using the carrier phase estimation apparatus in this embodiment.

FIG. 4 shows the bit error rate characteristics and the vertical and horizontal axes represent a bit error rate and a Eb/N0 (Eb is the energy per bit and No is the noise spectral density), respectively. In FIG. 4, white small circles plot the characteristics of the conventional carrier phase estimation apparatus and black small circles plot the characteristics of the first embodiment of the carrier phase estimation apparatus according to the present invention. Also, a theoretical value shown in FIG. 4 represents bit error rate characteristics if the estimation error=0 is achieved. That is, this theoretical value indicates the limit of the attainable performance of the carrier phase estimation apparatus.

TABLE 1

| Simulation conditions: | |
| --- | --- |
| Fading: | Rician Fading<br>C/M*¹ = 10 dB<br>$f_d$*² = 200 Hz |
| Modulation: | QPSK (differential encoding) |
| Symbol rate: | 3.375 kbps |
| Shift register stage number: | 9 |

*¹: Direct to multipath signal power ratio
*²: Maximum Doppler frequency

As shown in FIG. 4, in this embodiment, in comparison with the conventional carrier phase estimation apparatus, it is found that the bit error rate is small and a floor value of the bit error rate (in case of small noise, that is, a large Eb/N0 value, a value of a bit error rate approached to a fixed value) can be reduced to approximately ⅓. Hence, it is readily understood that the carrier phase estimation apparatus according to the present invention can suitably follow up the fluctuation of the carrier phase due to fading and realize excellent bit error rate characteristics.

FIG. 4 shows one example of the characteristics obtained by applying the weighting factor $C_k$ represented by formula (9). However, the weighting factor $C_k$ is not restricted to this case and, of course, various settings are possible. For example, the weighting factor $C_k$ can also be represented by formula (9') as follows.

$$C_k = \cos(k\pi/4) \text{ (but } C_k = 0 \text{ when } k \geq 2) \tag{9'}$$

In this case, the weighting factor $C_k$ is settled such as $C_o$=1, $C_1$=0.707, $C_2$, ... =0.

Figure 15:
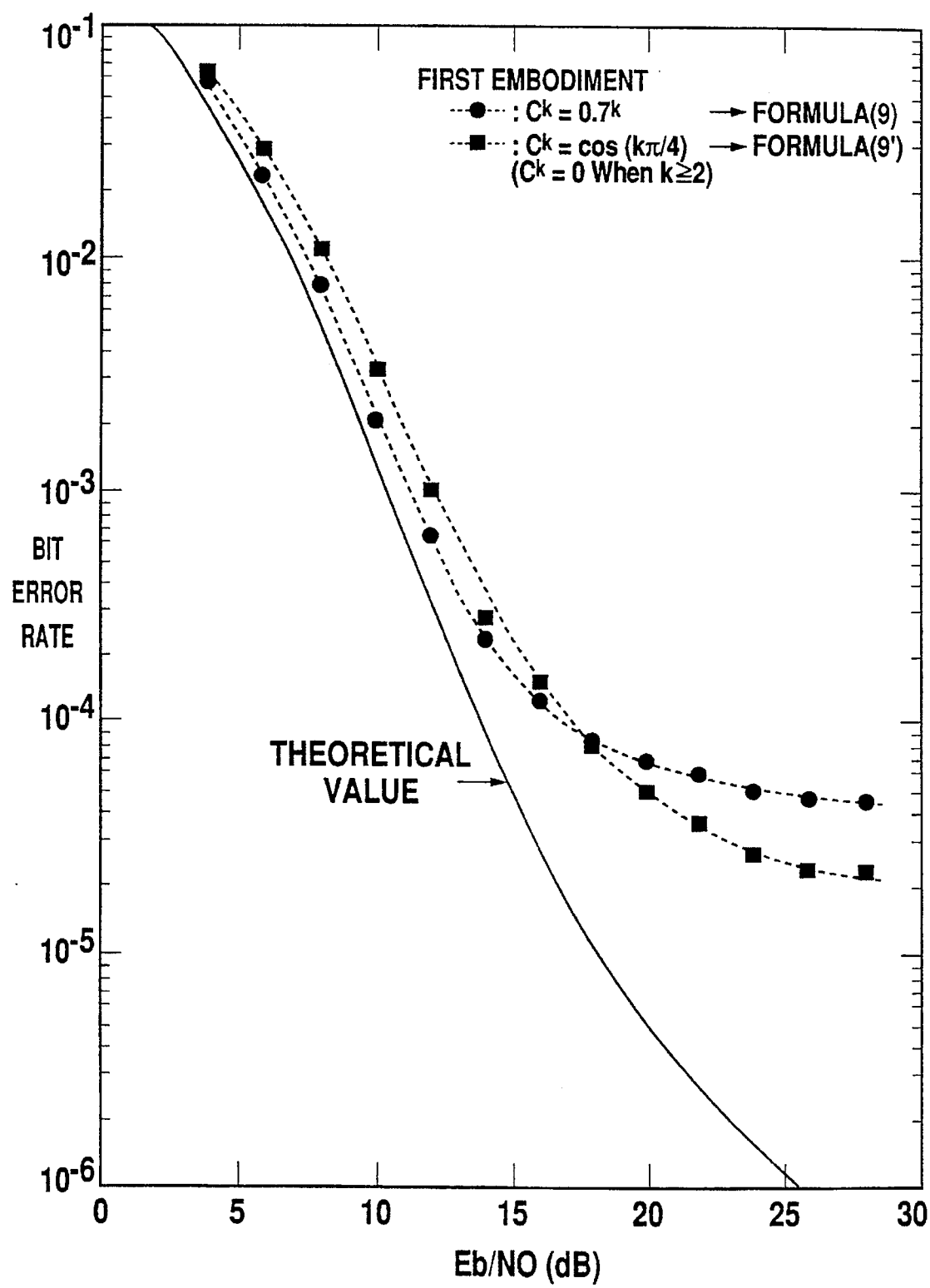
FIG. 15 is a graphical representation showing bit error rate characteristics obtained by applying formula (9') according to the present invention.

When formula (9') is applied to the weighting factor $C_k$, there is shown in FIG. 15 the result of the bit error rate characteristics obtained under the same conditions as shown in Table 1 in a similar manner to the case shown in FIG. 4. In this case, from FIG. 15, it is readily understood that the floor value of the bit error rate can be further reduced in comparison with the case when formula (9) is applied. However, in this instance of formula (9'), in the state that the value of Eb/N0 is smaller than approximately 18 dB, the bit error rate becomes larger than the case of formula (9). Accordingly, a modified system of the first embodiment described above can be considered. That is, the state (Eb/N0 value) of the channel is detected and by adaptably or suitably varying the setting of the weighting factor $C_k$ based on this detected value, better bit error rate characteristics can be realized. In the above-described embodiment, when the Eb/N0 value is larger than 18 dB, formula (9') is applied and, when the Eb/N0 value is smaller than 18 dB, formula (9) is applied. In the case that the Eb/N0 value is varied by moving a movable body, this modified system can realize a smaller bit error rate.

Figure 11:
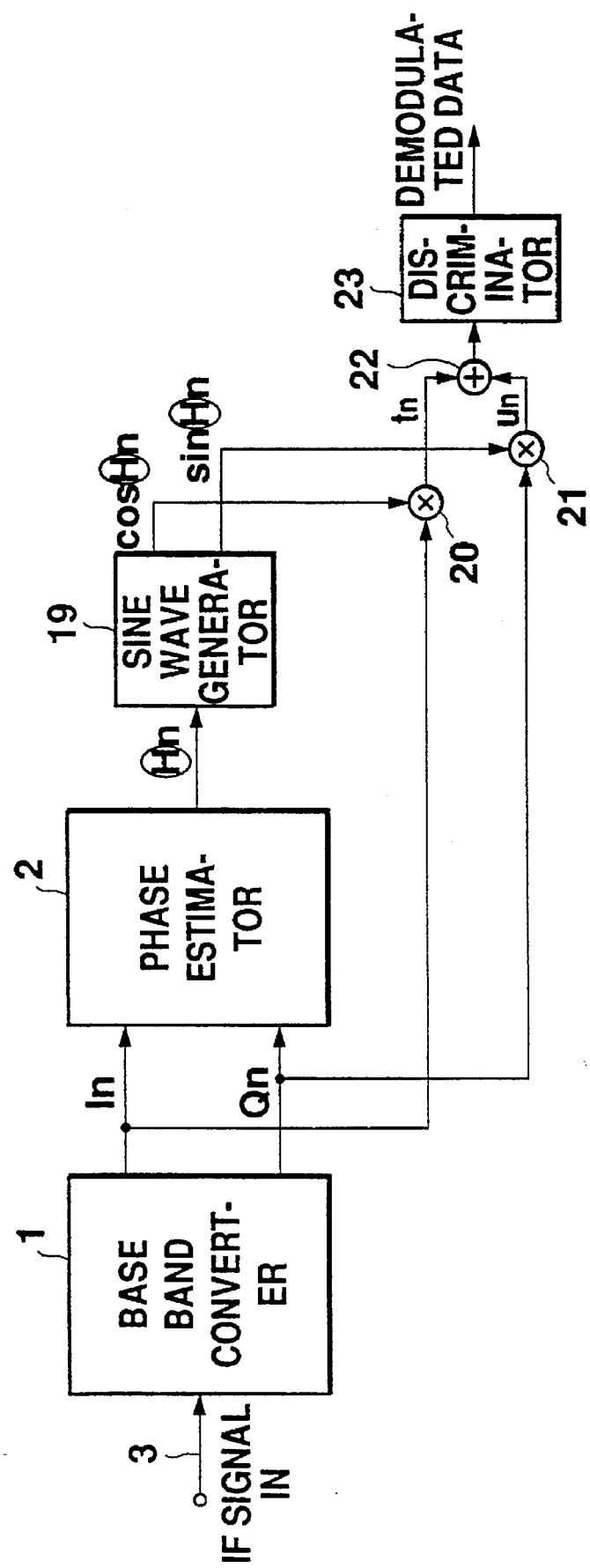
FIG. 11 is a block diagram of a data demodulation apparatus to which the conventional carrier phase estimation apparatus is applied.
Figure 16:
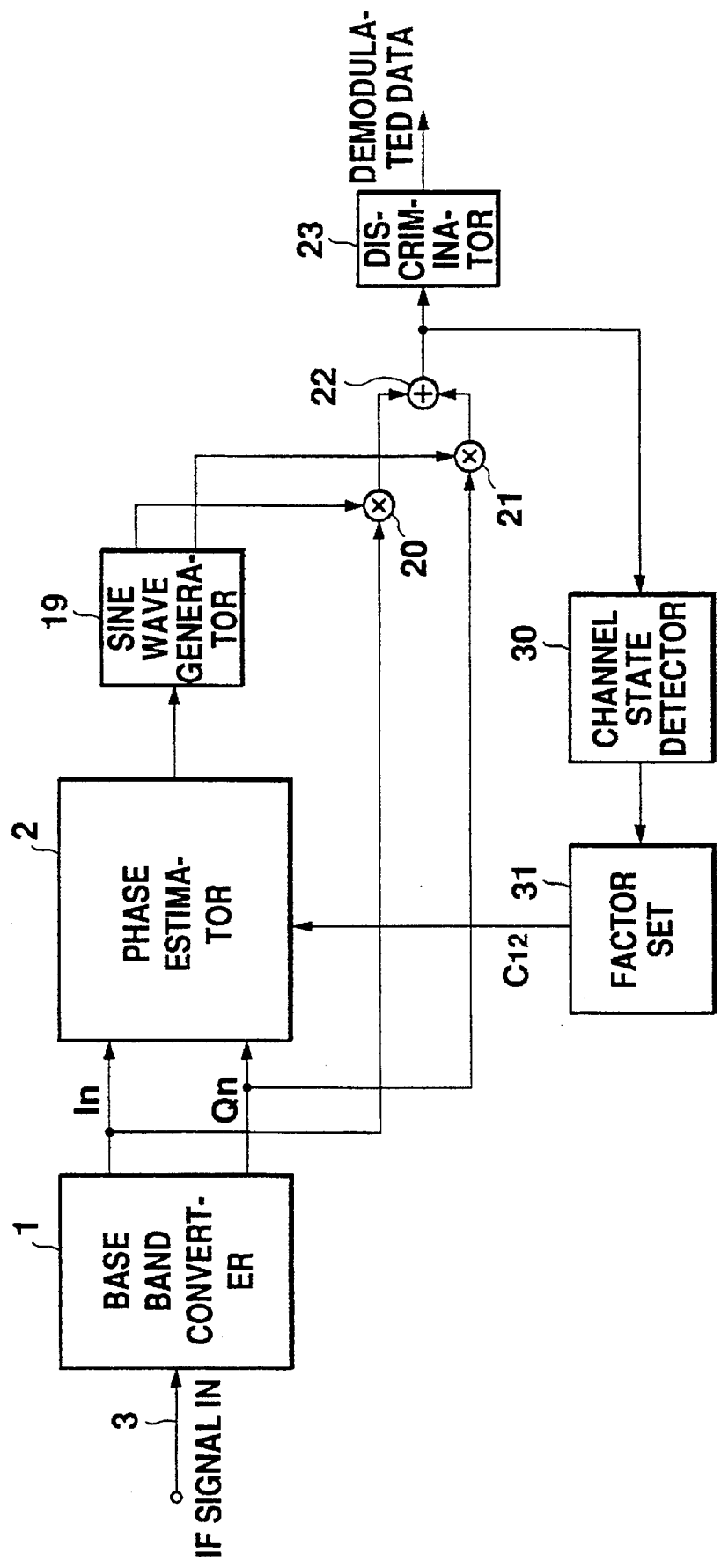
FIG. 16 is a block diagram of a data demodulation apparatus to which another carrier phase estimation apparatus according to the present invention is applied.

In FIG. 16, there is shown a data demodulation apparatus to which a modified carrier phase estimation apparatus for realizing the aforementioned modified system of the first embodiment is applied. In FIG. 16, compared with the conventional data demodulation apparatus shown in FIG. 11, a channel state detector 30 detects the state (Eb/N0 value) of the channel and a factor set circuit 31 sets a suitable weighting factor $C_k$ on the basis of the Eb/N0 value detected by the channel state detector 30 and delivers the set weighting factor $C_k$ to the phase estimator 2. In this case, the Eb/N0 value can be detected by a statistical processing of demodulated signals. That is, by carrying out an averaging of the demodulated signals for a certain degree of real time, a signal power can be detected and by calculating the variance of the demodulated signals, a noise signal power can be detected.

In the modified system of the first embodiment, although the Eb/N0 value is detected as the state of the channel and the weighting factor $C_k$ is set on the basis of the detected Eb/N0 value, for example, it is possible to detect the fading state such as C/M (direct to multipath signal power ratio) or $f_d$ (maximum Doppler frequency) and to determine a proper weighting factor $C_k$ on the basis of the fading detection. In this case, the channel state detector 30 functions to detect the C/M or the $f_d$.

Figure 2:
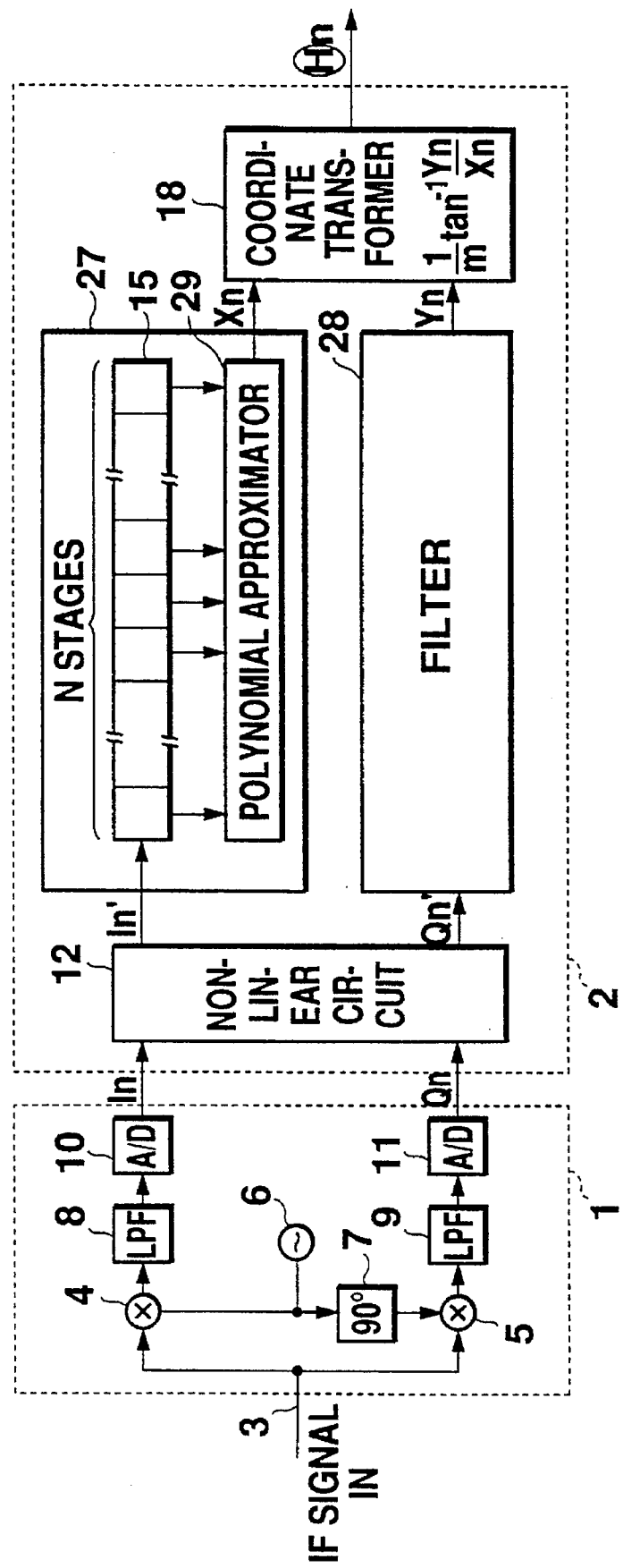
FIG. 2 is a block diagram of a second embodiment of a carrier phase estimation apparatus according to the present invention.

Next, in FIG. 2, there is shown the second embodiment of a carrier phase estimation apparatus according to the present invention. In this embodiment, as shown in FIG. 2, a pair of filters 27 and 28 having the same construction received as input the in-phase component In' and the quadrature component Qn' of the digital base band signal from the non-linear circuit 12 and execute the filtering. The filter 27 includes the N stages of shift registers 15 and a polynomial approximator 29 which is connected in parallel with the shift registers 15 and carries out a polynomial approximation by using the signals stored in the shift registers 15 to output the filter output signal Xn to the coordinate transformer 18.

Next, the operation of the carrier phase estimation apparatus shown in FIG. 2 will now be described in connection with FIG. 12 and FIG. 13 in the same manner as described above.

Figure 12:
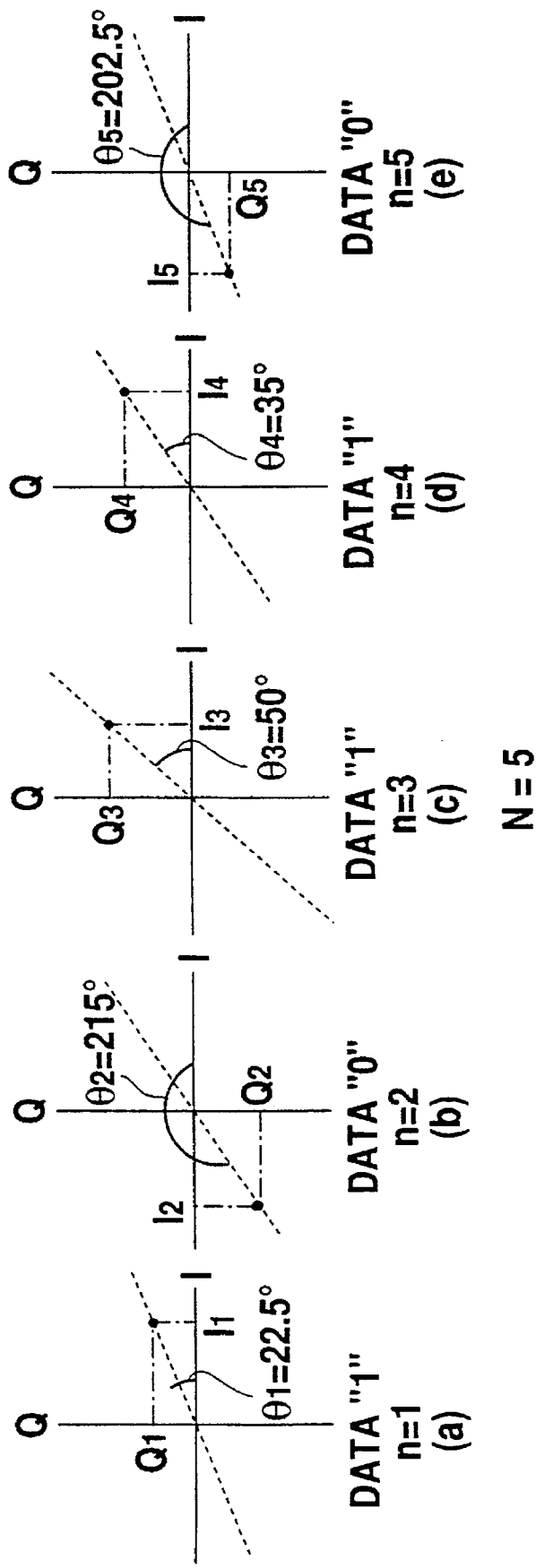
FIG. 12 is a graphical representation showing digital base band signals fluctuating due to fading in the conventional apparatus.

As shown in FIG. 12, the components In and Qn (n=1 to 5) of the digital base band signal, fluctuating due to fading, are input to the non-linear circuit 12 in the phase estimator 2. The non-linear circuit 12 performs a non-linear conversion of the components In and Qn and outputs an in-phase component In' and an quadrature component Qn' of the digital base band signal, as shown in FIG. 13. The in-phase component In' of the digital base band signal is input from the non-linear circuit 12 to the filter 27 and the quadrature component Qn' of the same is input to the filter 28.

In the filter 27, the in-phase component In' is input to the shift registers 15 and the in-phase component In' stored in the shift registers 15 is input to the polynomial approximator 29 at the input timing of the shift registers 15. The polynomial approximator 29 approximates the in-phase component In' by a polynomial expression of n-th degree and calculates the in-phase component In' at the timing for estimating the carrier phase by using the approximation polynomial expression to output a calculated new value, that is, the filter output signal Xn. In this case, as described above, n takes values such as n=0, 1, 2, 3, . . . . These values represent the relative time differences between the signals stored in the shift registers 15.

The filter 28 having the same construction as the filter 27 operates the input quadrature components Qn' of the digital base band signals in the same manner as the filter 27 to output the filter output signal Yn.

The polynomial approximator 29 executes the polynomial approximation by the least square method by using the N number of signals input to the filter. For instance, it is considered a quadratic polynomial expression represented by formula (11) as follows.

$$PIn'=a+bn+cn^2 \qquad (11)$$

In this formula, a, b and c represent factors of the quadratic polynomial equation. The polynomial approximation performs a least square method, to obtain the factors of the polynomial approximation in equation (11). By carrying out a quadratic polynomial equation approximation of formula (11) against the example shown in FIG. 13, the factors of the approximate polynomial expression PIn' are obtained such as a=1.631, b=−1.068 and c=0.178. The filter output signal $X_3$ is calculated by setting the obtained factors a, b and c and by substituting 3 for n. That is, $$X_3=1.631-1.068\times3+0.178\times3^2=1.129 \qquad (12)$$

The same approximation is executed in the filter 28 by using an approximate quadratic polynomial expression PQn' represented by formula (13) as follows.

$$PQn'=a+bn+cn^2 \qquad $$

The factors of the polynomial expression PQn' are obtained in the same manner as described above, such as a=0.512, b=0.255 and c=−0.033. As a result, the filter output signal $Y_3$ is calculated as follows.

$$Y_3=0.512+0.255\times3-0.033\times3^2=0.980 \qquad (14)$$

Figure 5:
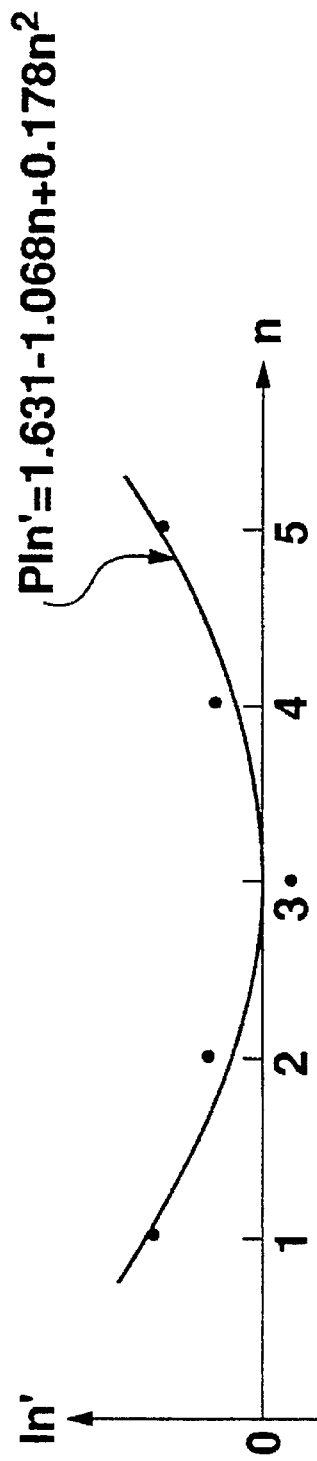
FIGS. 5(a) and 5(b) are graphical representations for explaining a polynomial approximation in the second embodiment of the present invention.
Figure 5:
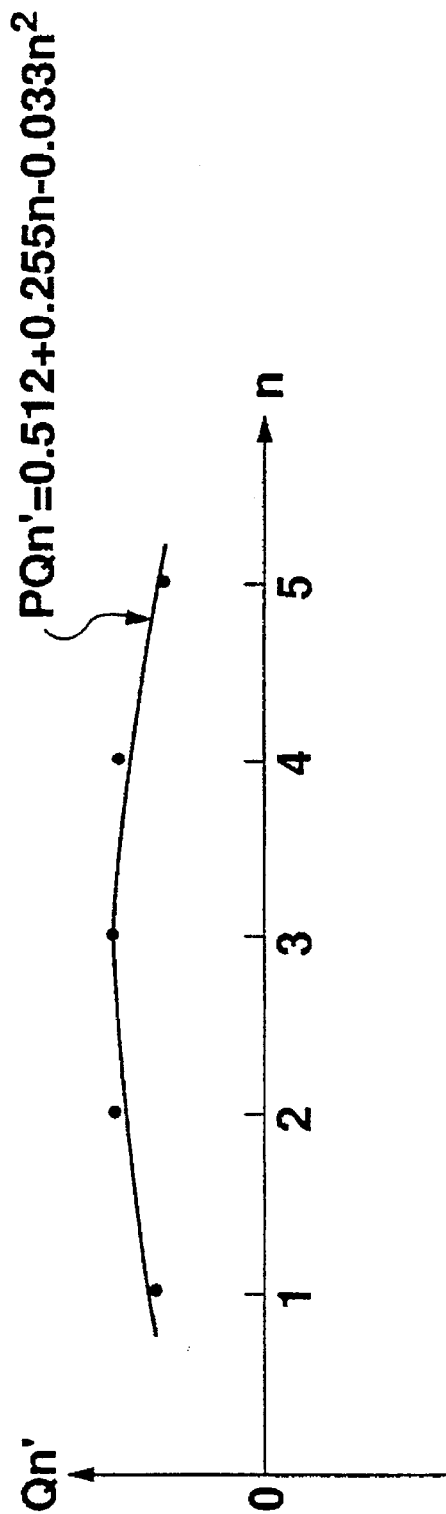

FIGS. 5(a) and 5(b) illustrate the above-described approximation processing.

The coordinate transformer 18 operates on the filter output signals $X_3$ and $Y_3$ according to formula (4) to output the estimated carrier phase $\Theta_3$. In this embodiment, the estimated carrier phase $\Theta_3$ is calculated as follows.

$$\Theta_3=(½)\cdot\tan^{-1}(0.980/0.029)=44.2° \qquad (15)$$

If it is assumed that no influence of noise or the like is received, basically, the value of the true carrier phase to be estimated is $\Theta_3=50°$ and the estimation error of the estimated carrier phase obtained In this embodiment is 5.8°. This estimation error is smaller than the 17.1° obtained in the conventional carrier phase estimation apparatus described above. As described above, in this embodiment, the approximation is executed not by simple averaging, but by the polynomial expression and the carrier phase estimation is performed. Hence, it is clear that the carrier phase estimation apparatus according to the present invention can properly follow up the carrier phase fluctuating due to fading.

Figure 6:
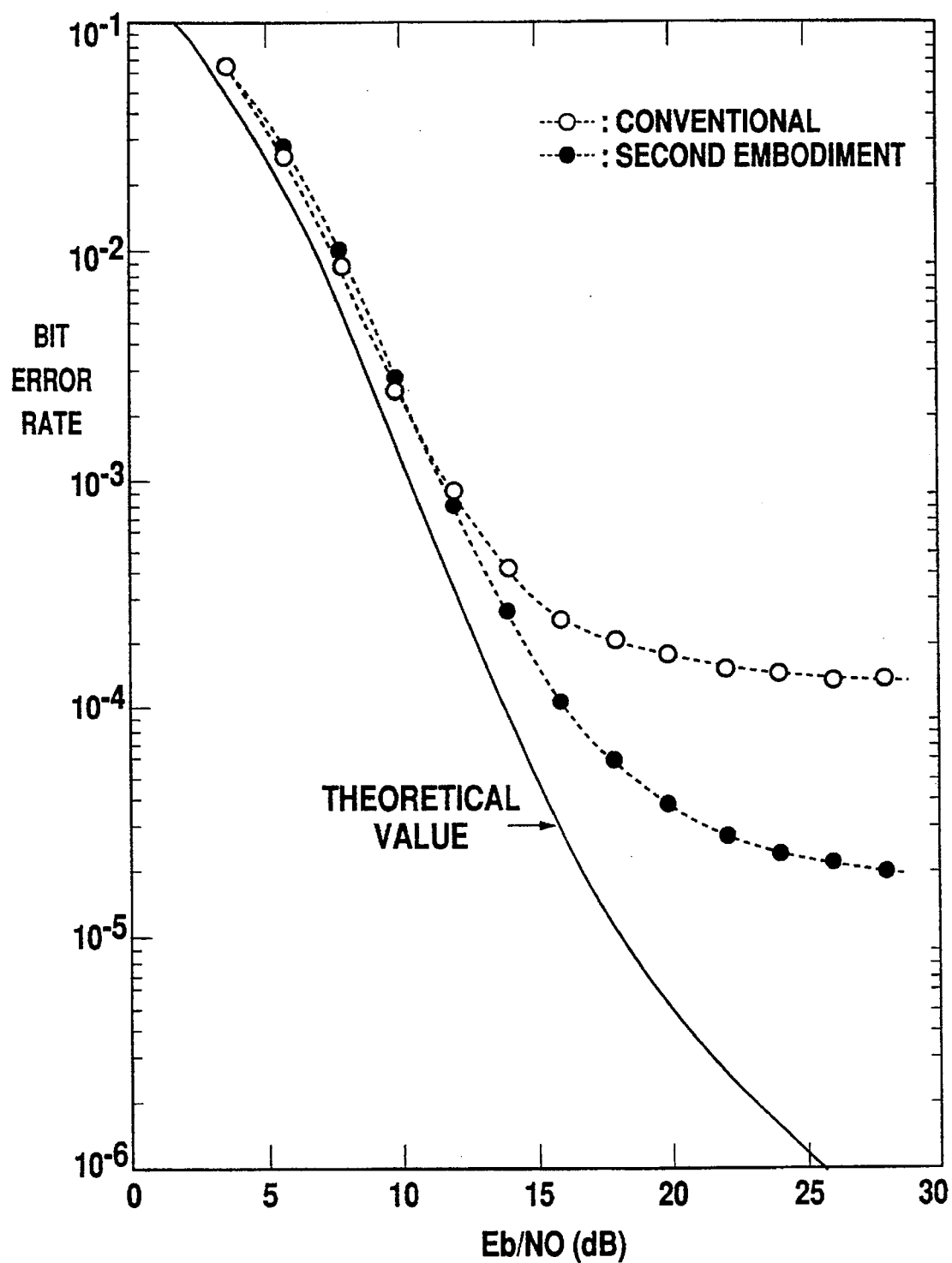
FIG. 6 is a graphical representation showing the bit error rate characteristics obtained in the second embodiment of the present invention.
Figure 7:
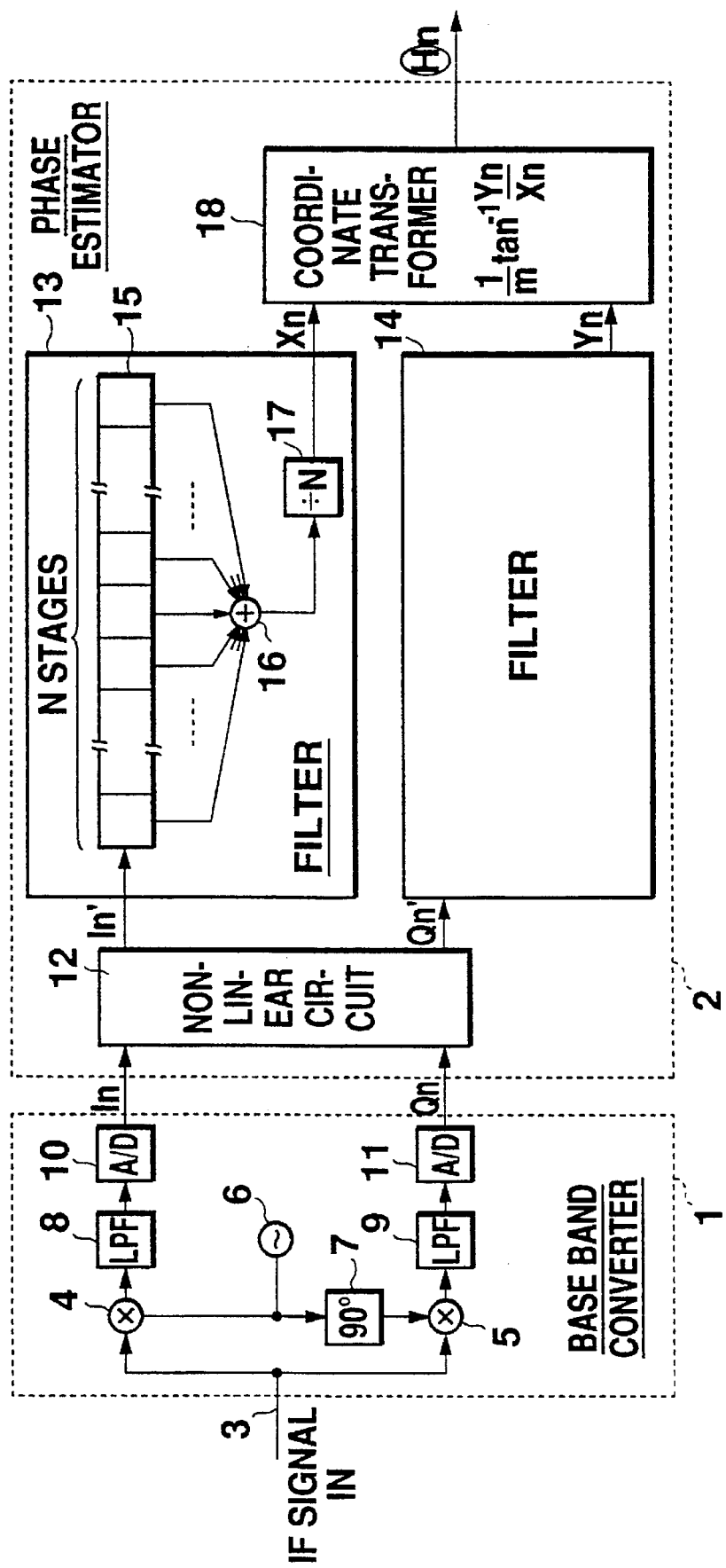
FIG. 7 is a block diagram of a conventional carrier phase estimation apparatus.
Figure 8:
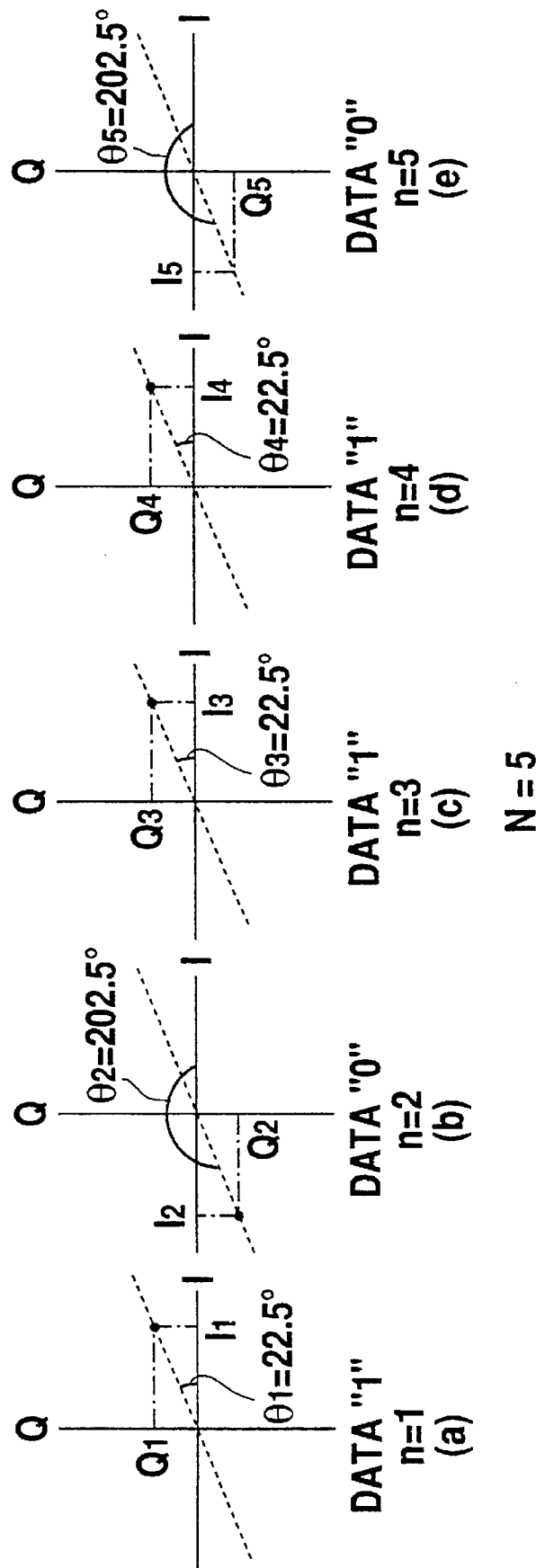
FIG. 8 is a graphical representation showing digital base band signals obtained in the conventional apparatus.
Figure 9:
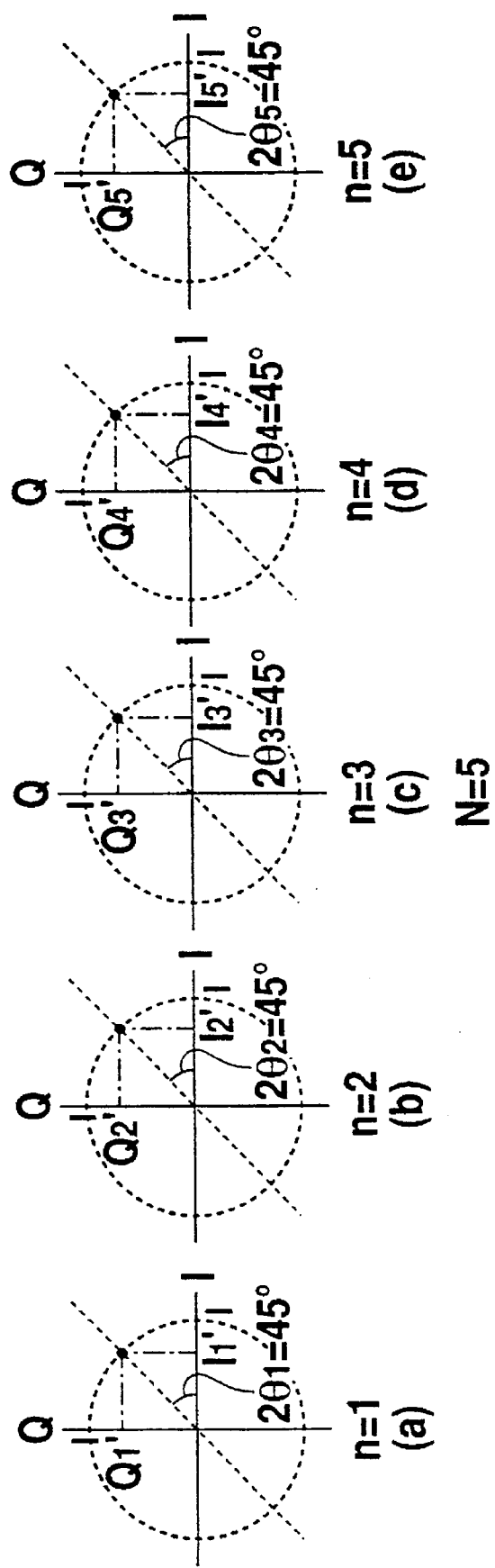
FIG. 9 is a graphical representation showing non-linearly converted digital base band signals obtained in the conventional apparatus.

FIG. 6 shows the simulation result of the bit error rate characteristics realized by using the carrier phase estimation apparatus in the second embodiment. This simulation result is obtained under the conditions shown in Table 1 described above. It is readily understood from FIG. 6 that, in comparison with the conventional carrier phase estimation apparatus, when the Eb/N0 value is small, nearly equal characteristics can be realized and, when the Eb/N0 value is large, the floor of the bit error rate can be reduced to approximately ⅕. In actual fact, when the Eb/N0 value is extremely small, the characteristics obtained in the second embodiment are slightly below the conventional case. However, there is no problem in practice and it is readily understood from FIG. 6 that this difference will be in a negligible range. As described above, according to the carrier phase estimation apparatus of this embodiment, the fluctuation of the carrier phase due to fading can be properly followed up. As a result, in this embodiment, the bit error rate characteristics can be improved.

As described above, according to the present invention, the carrier phase estimation apparatus having the excellent follow-up characteristics against the carrier phase fluctuating due to fading can be obtained. That is, according to the present invention, the carrier phase estimation apparatus having excellent bit error rate characteristics can be obtained.

Although the present invention has been described in its preferred embodiments with reference to the accompanying drawings, it it readily understood that the present invention is not restricted to the preferred embodiments and that various changes and modifications can be made by those skilled in the art without departing from the spirit and scope of the present invention.

What is claimed is:

1. A carrier phase estimation apparatus for use in a data demodulation apparatus for providing an estimated phase of a received signal, the data demodulation apparatus having a discriminator that receives at an input a modulated signal and provides at an output a demodulated signal, the carrier phase estimation apparatus comprising:
 a) base band converter means for converting the received signal into a base band signal;
 b) non-linear converter means for carrying out a non-linear conversion of the base band signal to output a non-linear conversion signal;
 c) filter means for sampling the non-linear conversion signal at predetermined time intervals to obtain a plurality of sampled non-linear conversion signals, for selecting a plurality of weighting factors based on a control signal indicative of a signal to noise ratio of the received signal, each weighting factor corresponding to one of the plurality of sampled non-linear conversion signals, for multiplying the plurality of weighting factors with the plurality of sampled non-linear conversion signals to obtain a plurality of resulting signals, and for combining the plurality of resulting signals to obtain a filter output signal;
 d) coordinate transform means for transforming the filter output signal into an estimated carrier phase signal; and
 e) channel state detecting means for coupling to the input of the discriminator to receive the modulated signal, for detecting the signal to noise ratio of the received signal based on characteristics of the modulated signal and for providing the control signal indicative of the signal to noise ratio to the filter means.

2. The carrier phase estimation apparatus of claim 1, wherein the carrier phase is estimated at a plurality of time intervals including a present time interval, wherein each of the plurality of weighting factors corresponds to one of the plurality of time intervals, and wherein the weighting factor corresponding to the present time interval is greater than the other weighting factors.

3. A carrier phase estimation apparatus for use in a data demodulation apparatus for providing an estimated phase of a received signal, the data demodulation apparatus having a discriminator that receives at an input a modulated signal and provides at an output a demodulated signal, the carrier phase estimation apparatus comprising:
 a) digital base band converter means for converting received signals into digital base band signals sampled at predetermined time intervals;
 b) non-linear converter means for carrying out a non-linear conversion of the digital base band signals to output a plurality of digital non-linear conversion signals;
 c) shift register means for storing the plurality of digital non-linear conversion signals;
 d) multiplier means for selecting a plurality of weighting factors based on a control signal indicative of a signal to noise ratio of the received signal, each of the plurality of weighting factors corresponding to one of the plurality of digital non-linear conversion signals stored in the shift register means, and for multiplying the plurality of weighting factors with the corresponding respective digital non-linear conversion signals to obtain a plurality of multiplication signals;
 e) adder means for combining the plurality of multiplication signals to output a filter output signal;
 f) coordinate transform means for transforming the filter output signal into an estimated carrier phase signal; and
 g) channel state detecting means for coupling to the input of the discriminator, for detecting the signal to noise ratio of the received signal based on characteristics of the modulated signal and for providing the control signal indicative of the signal to noise ratio to the multiplier means.

4. The carrier phase estimation apparatus of claim 3, wherein the carrier phase is estimated at a plurality of time intervals including a present time interval, wherein each of the plurality of weighting factors corresponds to one of the plurality of time intervals, and wherein the weighting factor corresponding to the present time interval is greater than the other weighting factors.

5. A carrier phase estimation apparatus for estimating a carrier phase of a phase shift keying modulated received signal in a data demodulation apparatus, the data demodulation apparatus having a discriminator that receives at an input a modulated signal and provides at an output a demodulated signal, the carrier phase estimation apparatus comprising:
 a) base band converter means for converting the received signal into a base band signal; and
 b) phase estimating means for filtering the base band signal to estimate the carrier phase and to output an estimated carrier phase signal, the phase estimating means including:

non-linear converter means for carrying out a non-linear conversion of the base band signal to output a non-linear conversion signal;

filter means for, sampling the non-linear conversion signal at predetermined time intervals to obtain a plurality of sampled non-linear conversion signals, for selecting a plurality of weighting factors based on a control signal indicative of a signal to noise ratio of the received signal, each weighting factor corresponding to one of the plurality of sampled non-linear conversion signals, for multiplying the plurality of weighting factors with the plurality of sampled non-linear conversion signals to obtain a plurality of resulting signals, and for combining the plurality of resulting signals to obtain a filter output signal;

coordinate transform means for transforming the filter output signal into an estimated carrier phase signal; and channel state detecting means for coupling to the input of the discriminator, for detecting the signal to noise ratio of the received signal based on characteristics of the modulated signal and for providing the control signal indicative of the signal to noise ratio to the filter means.

6. The carrier phase estimation apparatus of claim 5, wherein the carrier phase is estimated at a plurality of time intervals including a present time interval, wherein each of the plurality of weighting factors corresponds to one of the plurality of time intervals, and wherein the weighting factor corresponding to the present time interval being greater than the other weighting factors.

7. A carrier phase estimation apparatus for estimating a carrier phase of a phase shift keying modulated received signal in a data demodulation apparatus, the data demodulation apparatus having a discriminator that receives at an input a modulated signal and provides at an output a demodulated signal, the carrier phase estimation apparatus comprising:

a) digital base band converter means for converting the received signal into digital base band signals sampled at predetermined time intervals; and b) phase estimating means for filtering the digital base band signals and outputting an estimated carrier phase signal;

the phase estimating means including:

non-linear converter means for carrying out a non-linear conversion of the digital base band signals to output a plurality of digital non-linear conversion signals;

shift register means for storing the plurality of digital non-linear conversion signals;

multiplier means for selecting a plurality of weighting factors based on a control signal indicative of a signal to noise ratio of the received signal, each of the plurality of weighting factors corresponding to one of the plurality of digital non-linear conversion signals stored in the shift register means and for multiplying the plurality of weighting factors with the corresponding digital non-linear conversion signals to obtain a plurality of multiplication signals;

adder means for combining the multiplication signals to output a filter output signal;

coordinate transform means for transforming the filter output signal into an estimated carrier phase signal; and channel state detecting means for coupling to the input of the discriminator, for detecting the signal to noise ratio of the received signal based on characteristics of the modulated signal and for providing the control signal indicative of the signal to noise ratio.

8. The carrier phase estimation apparatus of claim 7, wherein the carrier phase is estimated at a plurality of time intervals including a present time interval, wherein each of the plurality of weighting factors corresponds to one of the plurality of time intervals, and wherein the weighting factor corresponding to the present time interval being greater than the other weighting factors.

9. A method for estimating the carrier phase of a received signal in a data demodulation apparatus, the data demodulation apparatus having a discriminator that receives at an input a modulated signal and provides at an output a demodulated signal, the method comprising the steps of:

A. converting the received signal into base band signals;

B. converting the base band signals into non-linear conversion signals;

C. sampling the non-linear conversion signals at predetermined time intervals to obtain a plurality of sampled non-linear conversion signals;

D. selecting a plurality of weighting factors based on characteristics of the modulated signal input to the discriminator, each weighting factor corresponding to one of the plurality of non-linear conversion signals;

E. multiplying the plurality of weighting factors with the plurality of non-linear conversion signals to obtain a plurality of resulting signals;

F. combining the plurality of resulting signals to obtain a filter output signal; and G. transforming the filter output signal into an estimated carrier phase.

10. A data demodulation apparatus comprising:

a base band converter for converting received signals into baseband signals;

a filter means, for receiving the baseband signals and outputting an estimated carrier phase signal, said filter means includes;

a non-linear converter for carrying out a non-linear conversion of the base band signals into non-linear conversion signals;

means for sampling the non-linear conversion signals at predetermined time intervals to obtain a plurality of sampled non-linear conversion signals, for selecting a plurality of weighting factors based on a control signal indicative of a signal to noise ratio of the received signal, each weighting factor corresponding to one of the plurality of sampled non-linear conversion signals, for multiplying the plurality of weighting factors with the plurality of sampled non-linear conversion signals to obtain a plurality of resulting signals, and for combining the plurality of resulting signals to obtain a filter output signal; and a coordinate transformer for transforming the filter output signal into an estimated phase;

a signal generator which receives the estimated phase value and outputs a sine wave signal and a cosine wave signal, at the estimated phase value;

combining means, coupled to the signal generator and the baseband converter, for combining the sine wave signal, the cosine wave signal and the baseband signals to provide a modulated signal;

a discriminator which receives the modulated signal and outputs a demodulated data signal; and channel state detecting means, coupled to the combining means to receive the modulated signal, for determining a signal to noise ratio of the received signal based on characteristics of the modulated signal and for providing the control signal indicative of the signal to noise ratio to the means for sampling.

11. The apparatus of claim 10, wherein the carrier phase is estimated at a plurality of time intervals including a present time interval, each of the plurality of weighting factors corresponds to one of the plurality of time intervals, and the weighting factor corresponding to the present time interval is greater than the other weighting factors.

12. A data demodulation apparatus comprising:

a baseband converter having an input that receives a received signal and first and second outputs that provide respectively first and second baseband signals;

a phase estimator having a first input that receives the first baseband signal, a second input that receives a plurality of weighting factors and an output that provides an estimated carrier phase signal, the phase estimator including;

a non-linear converter that converts the first baseband signal into a non-linear conversion signal, a sampling circuit that samples the non-linear conversion signal at predetermined time intervals to obtain a plurality of sampled non-linear conversion signals, an averaging circuit that performs a weighted average of the plurality of sampled non-linear conversion signals using the plurality of weighting factors to obtain an averaged signal, and a coordinate transform circuit that receives the averaged signal and provides the estimated carrier phase signal;

a signal generator that receives the estimated carrier phase signal and that provides a cosine signal and a sine signal having a phase determined by the estimated phase signal;

a combining circuit coupled to the first and second outputs of the baseband converter to receive the first and second baseband signals and coupled to the signal generator to receive the cosine signal and the sine signal, the combining circuit having an output that provides a modulated signal that is a combination of the sine signal the cosine signal and the first and second baseband signals;

a discriminator having an input coupled to the output of the combining circuit to receive the modulated signal and having an output that provides a demodulated data signal;

a channel state detector, having an input coupled to the input of the discriminator to receive the modulated signal and an output that provides a noise ratio signal, the noise ratio signal being determined based on a signal to noise ratio of the received signal;

a factor determining circuit having an input coupled to the output of the channel state detector to receive the noise ratio signal and an output coupled to the second input of the phase estimator to provide the plurality of weighting factors, the plurality of weighting factors being determined by the factor determining circuit based on the signal to noise ratio of the received signal.

13. The data demodulator of claim 12, wherein the phase estimator estimates a phase of the received signal at a plurality of time intervals including a present time interval, each of the plurality of weighting factors corresponds to one of the plurality of time intervals, and a weighting factor corresponding to the present time interval is greater than other weighting factors of the plurality of weighting factors.

* * * * *